(12) United States Patent
Beser (10) Patent No.: US 7,720,002 B1
(45) Date of Patent: May 18, 2010

(54) SYSTEMS AND METHODS FOR INITIALIZING CABLE MODEMS

(75) Inventor: Nurettin Burcak Beser, Sunnyvale, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 1712 days.

(21) Appl. No.: 10/887,081

(22) Filed: Jul. 9, 2004

Related U.S. Application Data (60) Provisional application No. 60/485,713, filed on Jul. 10, 2003.

(51) Int. Cl.
H04L 12/28 (2006.01)
H04L 12/56 (2006.01)
H04L 12/42 (2006.01)
H04J 3/16 (2006.01)
H04N 7/173 (2006.01)

(52) U.S. Cl. .................. 370/254; 370/401; 370/437; 370/457; 725/96

(58) Field of Classification Search .................. None
See application file for complete search history.

(56) References Cited

U.S. PATENT DOCUMENTS

| | | | |
|---|---|---|---|
| 6,230,326 B1 * | 5/2001 | Unger et al. ............... 725/111 |
| 6,510,162 B1 * | 1/2003 | Fijolek et al. .............. 370/432 |
| 6,742,187 B1 * | 5/2004 | Vogel ...................... 725/126 |
| 7,058,007 B1 * | 6/2006 | Daruwalla et al. .......... 370/216 |
| 7,089,580 B1 * | 8/2006 | Vogel et al. ............... 725/111 |
| 7,359,332 B2 * | 4/2008 | Kolze et al. ............... 370/252 |
| 7,480,237 B2 * | 1/2009 | Nolle et al. ............... 370/229 |
| 7,548,558 B2 * | 6/2009 | Rakib et al. ............... 370/466 |
| 2002/0144284 A1 * | 10/2002 | Burroughs et al. .......... 725/111 |
| 2004/0221032 A1 * | 11/2004 | Bernstein et al. ........... 709/224 |
| 2005/0002331 A1 * | 1/2005 | Nolle et al. ............... 370/229 |
| 2006/0251097 A1 * | 11/2006 | Chapman et al. ........... 370/431 |

OTHER PUBLICATIONS

U.S. Appl. No. 60/463,565, filed Apr. 17, 2003, "Predictive Upstream Load Balancing", Steve Nolle, pp. 1-14.*
Data-Over-Cable Service Interface Specifications: Radio Frequency Specification SP-RFIv2.0-I03-021218; Dec. 18, 2002; pp. 233-299 and 325-377.

* cited by examiner

*Primary Examiner*—Gregory B Sefcheck
(74) *Attorney, Agent, or Firm*—Harrity & Harrity, LLP (57) ABSTRACT

A system includes a first device and a second device. The first device is configured to transmit a discover message on a first upstream channel, where the discover message includes information representing capabilities of the first device. The second device is configured to receive the discover message from the first device and determine whether to switch the first device to a second upstream channel based on the capabilities information in the discover message. The second device makes the determination before a registration of the first device. The second device transmits a message to the first device instructing the first device to switch to the second upstream channel based on a result of the determination.

28 Claims, 6 Drawing Sheets

SYSTEMS AND METHODS FOR INITIALIZING CABLE MODEMS

RELATED APPLICATION

This application claims priority under 35 U.S.C. §119 based on U.S. Provisional Application No. 60/485,713, filed Jul. 10, 2003, the entire disclosure of which is incorporated herein by reference.

FIELD OF THE INVENTION

The present invention relates generally to data communications and, more particularly, to data communications within cable modem systems.

BACKGROUND OF THE INVENTION

In cable modem systems, a cable modem termination system (CMTS) at one end of a cable network typically services multiple cable modems (CMs) connected to the cable network. CMs are generally installed locally at the end user's location, and communicate with the CMTS, which may be installed at a cable company's facility. The CMTS transmits data and messages to the CMs in a "downstream" direction and receives data bursts from the CMs in an "upstream" direction.

Data over Cable Service Interface Specification (DOCSIS) is a commonly used communications protocol that defines interface requirements for CMs. DOCSIS 2.0, for example, builds upon the capabilities of DOCSIS 1.0 and DOCSIS 1.1 and adds throughput in the upstream portion of the cable system. This increased upstream data capacity enables symmetrical and time-critical services, such as videoconferencing and peer-to-peer applications. When sharing a communication channel with a CMTS, the CMs may use modulation schemes in which the modems transmit data bursts to the CMTS during designated time intervals.

CMTSs typically receive data though a number of physical ports and further distinguish between different frequencies or "channels" of data using a number of internal receivers. Current CMTSs typically have a fixed relationship between their internal receivers and the physical ports.

Certain data communications, such as Voice over Internet Protocol (VoIP), may require data blocks to be transmitted on an upstream channel on a periodic basis, such as once in every 10 ms, 20 ms, or 30 ms time interval. The same time period may be allocated to the data communications within each time interval. It is important to use each upstream channel as fully as possible. Therefore, data blocks from different data communications may be packed together as much as possible.

CM initialization requires that certain information be communicated from the CMs to the CMTS on the upstream channels. As a result, CM initialization requires a lot of bandwidth, thereby limiting the amount of data communication that can occur on the upstream channels. In the current CM initialization process, the CMTS receives the CM's capabilities (e.g., information indicating the CM's configured class of service) in a registration message that is received near the end of the CM initialization process. In some instances, the CMTS may determine, based on these capabilities, that the CM needs to be switched from its current upstream channel to another upstream channel that is better suited to handling traffic for this particular CM. In such situations, the CM may need to be rebooted to the new upstream channel. The CM then re-performs the entire CM initialization process on the new upstream channel. This can cause significant delay to the end user(s) associated with the CM.

Accordingly, there is a need to improve the CM initialization process.

SUMMARY OF THE INVENTION

Systems and methods consistent with the principles of the invention address this and other needs by providing the CM's capabilities to the CMTS early in the CM initialization process. As such, the CMTS may switch the CM from a first upstream channel to a more appropriate upstream channel before the CM performs the entire initialization process on the first upstream channel.

In accordance with one implementation consistent with the principles of this invention as embodied and broadly described herein, a method for initializing a device in a cable modem network is provided. The method includes transmitting a discover message from the device to a CMTS on a first upstream channel, where the discover message includes information representing capabilities of the device; determining, at the CMTS, whether to switch the device to a second upstream channel based on the capabilities information in the discover message, where the determining occurs before a registration of the device; and transmitting a message to the device instructing the device to switch to the second upstream channel based on the determining.

In another implementation consistent with the principles of the invention, a system includes a first device and a second device. The first device is configured to transmit a discover message on a first upstream channel, where the discover message includes information representing capabilities of the first device. The second device is configured to receive the discover message from the first device and determine whether to switch the first device to a second upstream channel based on the capabilities information in the discover message. The second device makes the determination before a registration of the first device. The second device transmits a message to the first device instructing the first device to switch to the second upstream channel based on the determining.

In yet another implementation consistent with the principles of the invention, a method for initializing a device in a cable modem network is disclosed. The method includes receiving a discover message from the device via a first upstream channel, where the discover message includes information representing one or more capabilities of the device; determining whether to switch the device to a new upstream channel based on the one or more capabilities in the discover message; and transmitting a message to the device instructing the device to switch to the new upstream channel based on the determining. The transmitting a message to the device occurs prior to a registration of the device.

In still another implementation consistent with the principles of the invention, a network device in a cable network includes an upstream communication interface, a processing device, and a downstream communication interface. The upstream communication interface is configured to receive a message from a remote device via a first upstream channel, where the message includes information representing one or more capabilities of the remote device. The processing device is configured to determine whether to switch the remote device to a new upstream channel based on the one or more capabilities included in the received message. The downstream communication interface is configured to transmit a control message to the remote device instructing the remote device to switch to the new upstream channel based on the determining. The downstream communication interface transmits the control message prior to a registration of the remote device.

In a further implementation consistent with the principles of the invention, a method for initializing a device in a cable network is provided. The method includes generating a first message that includes one or more capabilities of the device; transmitting the first message to a remote device via a first upstream channel; and receiving, in response to the transmitting, a second message from the remote device, where the second message instructs the device to switch to a second upstream channel.

In yet a further implementation consistent with the principles of the invention, a method for initializing a device in a cable network is provided. The method includes generating a first message that includes one or more capabilities of the device; transmitting the first message to a remote device via a first upstream channel; receiving, in response to the transmitting, a second message from the remote device, where the second message instructs the device to switch to a second upstream channel; and switching the device to the second upstream channel without rebooting the device.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of implementations consistent with the present invention refers to the accompanying drawings. The same reference numbers in different drawings may identify the same or similar elements. Also, the following detailed description does not limit the invention. Instead, the scope of the invention is defined by the appended claims and their equivalents.

Systems and methods consistent with the principles of the invention optimize the CM initialization process in certain situations, such as where the CMTS determines that the initializing CM is to be switched to a different upstream channel. In an exemplary implementation, the CM provides its capabilities in a DHCP discover message, which allows the CMTS to determine the CM's capabilities early in the initialization process.

Exemplary System

Figure 1:
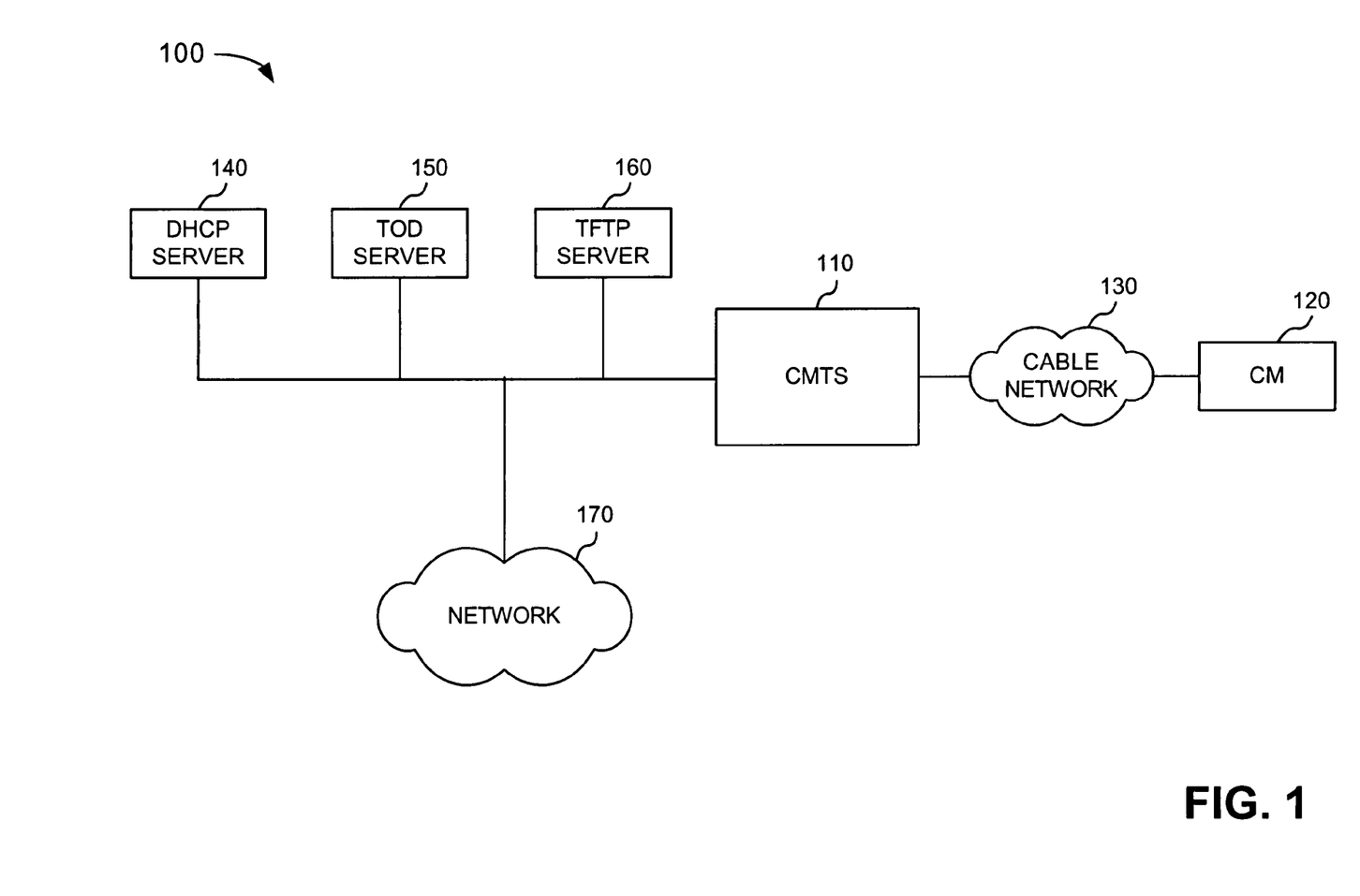
FIG. 1 is a diagram of an exemplary system in which systems and methods consistent with the principles of the invention may be implemented.

FIG. 1 is a diagram of an exemplary system 100 in which systems and methods consistent with the principles of the invention may be implemented. As illustrated, system 100 may include a CMTS 110 that connects to a CM 120 via a cable network 130, a number of servers 140-160, and a network 170.

CMTS 110 may transmit data received from server(s) 140-160 and/or network 170 on one or more downstream channels via cable network 130 to CM 120. CMTS 110 may also transmit data received from CM 120 to server(s) 140-160 and/or network 170. CM 120 may receive downstream transmissions from CMTS 110, process the transmissions in a well-known manner, and pass the processed transmissions on to customer premises equipment (CPE) (not shown). The CPE may include, for example, a television, a computer, a telephone, or any other type of equipment that can receive and/or send data via cable network 130. CM 120 may further receive data from the CPE, process the data, and transmit the data on one or more upstream channels to CMTS 110 via cable network 130.

Cable network 130 may include a coaxial or hybrid optical fiber/coaxial (HFC) cable network. CM 120 may interconnect with cable network 130 via coaxial cable/optical fiber. Servers 140-160 may include a dynamic host configuration protocol (DHCP) server 140, a time of day (TOD) server 150, and a trivial file transfer protocol (TFTP) server 160. DHCP server 140 may provide an Internet Protocol (IP) address and any other information needed to allow CM 120 to establish IP connectivity. TOD server 150 may provide CM 120, as well as CMTS 110, with the current date and time. CM 120 may use this time of day information, for example, for time-stamping events. TFTP server 160 may provide CM 120 with operational configuration parameters.

Network 170 can include one or more networks of any type, such as a Public Land Mobile Network (PLMN), Public Switched Telephone Network (PSTN), local area network (LAN), metropolitan area network (MAN), wide area network (WAN), the Internet, or an intranet. The PLMN may include packet-switched sub-networks, such as, for example, General Packet Radio Service (GPRS), Cellular Digital Packet Data (CDPD), and Mobile IP sub-networks.

It will be appreciated that the number of components and their arrangement as illustrated in FIG. 1 is provided for explanatory purposes only. A typical system may include more or fewer components than are illustrated in FIG. 1 and may be connected in different ways. For example, in a typical system, hundreds or thousands of CMs may be connected to a CMTS.

Exemplary CMTS Configuration

Figure 2:
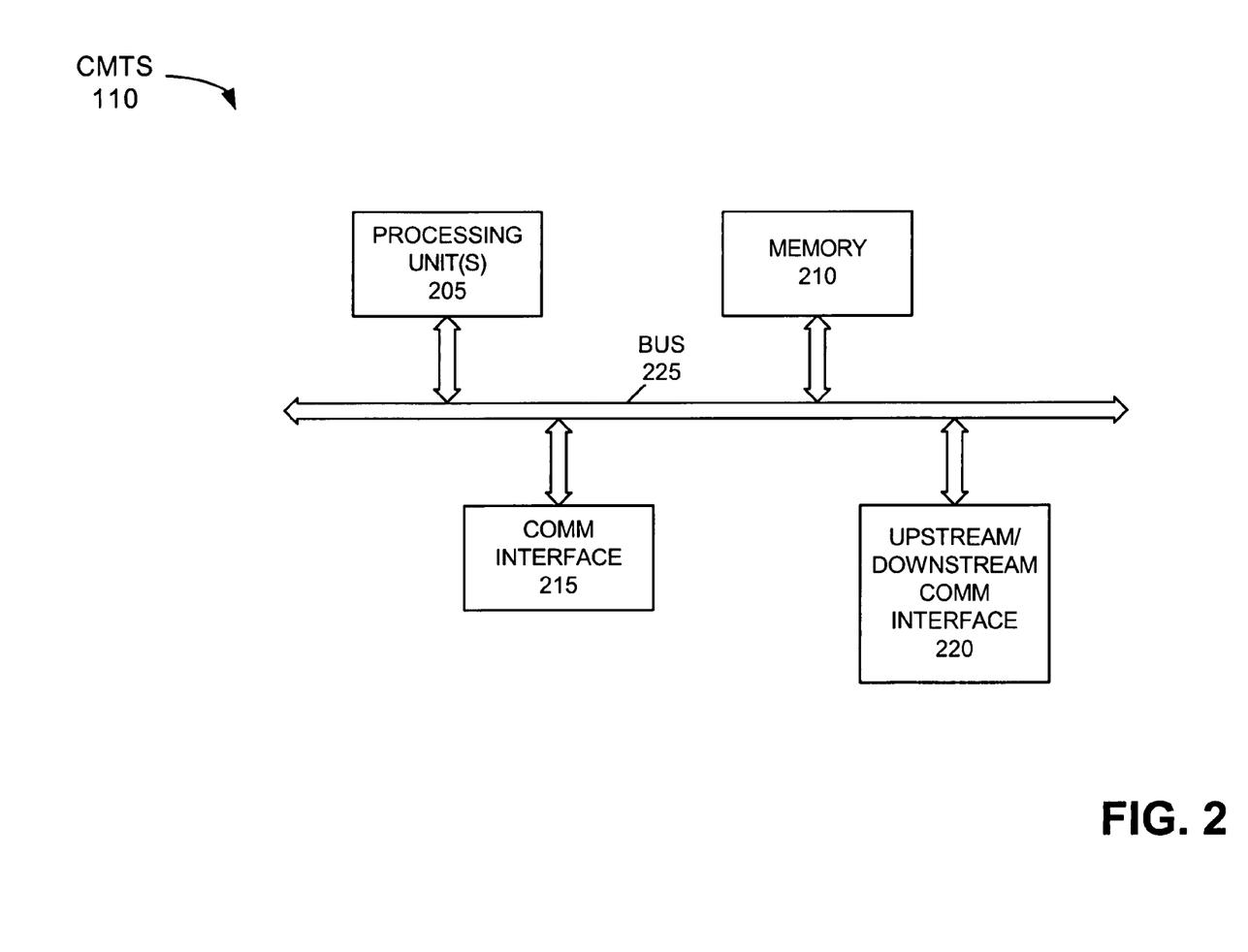
FIG. 2 is a diagram of an exemplary configuration of the CMTS of FIG. 1 in an implementation consistent with the principles of the invention.

FIG. 2 is a diagram of an exemplary configuration of CMTS 110 of FIG. 1 in an implementation consistent with the principles of the invention. As illustrated, CMTS 110 may include one or more processing units 205, a memory 210, a communication interface 215, an upstream/downstream communication interface 220, and a bus 225. It will be appreciated that CMTS 110 may include other components (not shown) that aid in the reception, processing, and/or transmission of data.

Processing unit(s) 205 may perform data processing functions for data transmitted/received via communication interface 215 to/from servers 140-160 and network 170, and data transmitted/received via upstream/downstream communication interface 220 to/from cable network 130. Memory 210 may include Random Access Memory (RAM) that provides temporary working storage of data and instructions for use by processing unit 205 in performing control and processing functions. Memory 210 may additionally include Read Only Memory (ROM) that provides permanent or semi-permanent storage of data and instructions for use by processing unit 205. Memory 210 can also include large-capacity storage devices, such as a magnetic and/or optical recording medium and its corresponding drive.

Communication interface 215 may include conventional circuitry well known to one skilled in the art for transmitting data to, or receiving data from, servers 140-160 and/or network 170. Upstream/downstream communication interface 220 may include transceiver circuitry for transmitting data bursts on downstream channels, and receiving data bursts on upstream channels, via cable network 130. Such transceiver circuitry may include amplifiers, filters, modulators/demodulators, interleavers, error correction circuitry, and other conventional circuitry used to convert data into radio frequency (RF) signals for transmission via cable network 130, or to interpret data bursts received from CM 120 via cable network 130 as data symbols.

Bus 225 interconnects the various components of CMTS 110 to permit the components to communicate with one another.

Exemplary CM Configuration

Figure 3:
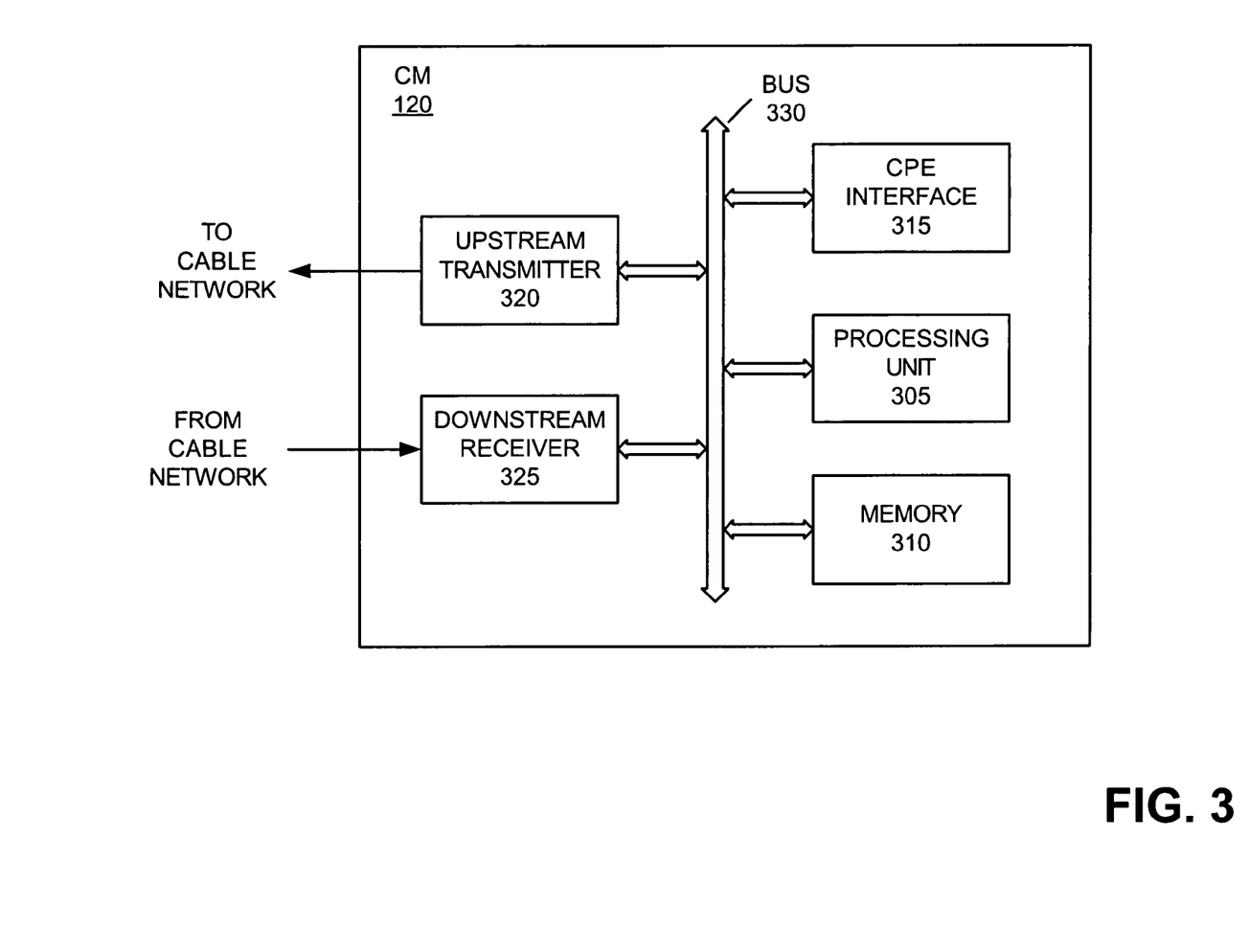
FIG. 3 is a diagram of an exemplary configuration of the CM of FIG. 1 in an implementation consistent with the principles of the invention.

FIG. 3 is a diagram of an exemplary configuration of CM 120 of FIG. 1 in an implementation consistent with the principles of the invention. As illustrated, CM 120 may include a processing unit 305, a memory 310, a CPE interface 315, an upstream transmitter 320, a downstream receiver 325, and a bus 330. It will be appreciated that CM 120 may include other components (not shown) that aid in the reception, processing, and/or transmission of data.

Processing unit 305 may perform data processing functions for data received via downstream receiver 325 and data transmitted via upstream transmitter 320. Processing unit 305 may also perform data processing functions for data transmitted to and received from CPE via CPE interface 315. Memory 310 may include a RAM that provides temporary working storage of data and instructions for use by processing unit 305 in performing control and processing functions. Memory 310 may additionally include some type of ROM that provides permanent or semi-permanent storage of data and instructions for use by processing unit 305. Memory 310 can also include large-capacity storage devices, such as a magnetic and/or optical recording medium and its corresponding drive.

CPE interface 315 may include circuitry well known to one skilled in the art for interfacing with CPE. Upstream transmitter 320 may include circuitry for transmitting on an upstream channel. For example, upstream transmitter 320 may include amplifiers, filters, modulators, interleavers, error correction circuitry, and other circuitry used to convert data into RF signals for transmission via cable network 130. Downstream receiver 325 may include circuitry for receiving data bursts on a downstream channel. For example, downstream receiver 325 may include amplifiers, filters, demodulators and other circuitry used to interpret data bursts received from CMTS 110 as data symbols.

Bus 330 interconnects the various components of CM 120 to permit the components to communicate with one another.

Exemplary Processing

As described above, during a conventional CM initialization process under the DOCSIS protocol, a large amount of data is typically exchanged between the initializing CM and the CMTS. When a large number of CMs connect to a CMTS, this initialization process can not only be time consuming, but can also consume a large amount of valuable upstream channel bandwidth. To better understand the advantages with respect to time and upstream channel bandwidth savings, a description of a conventional CM initialization process will be described with respect to FIG. 4. This conventional process is described in greater detail in Data-Over-Cable Service Interface Specifications (DOCSIS) Radio Frequency Interface Specification, SP-RFIv2.0-I03-021218, Cable Television Laboratories, Inc., Third Issued Release, Dec. 18, 2002, pp. 233-251, which is hereby incorporated by reference in its entirety.

Figure 4:
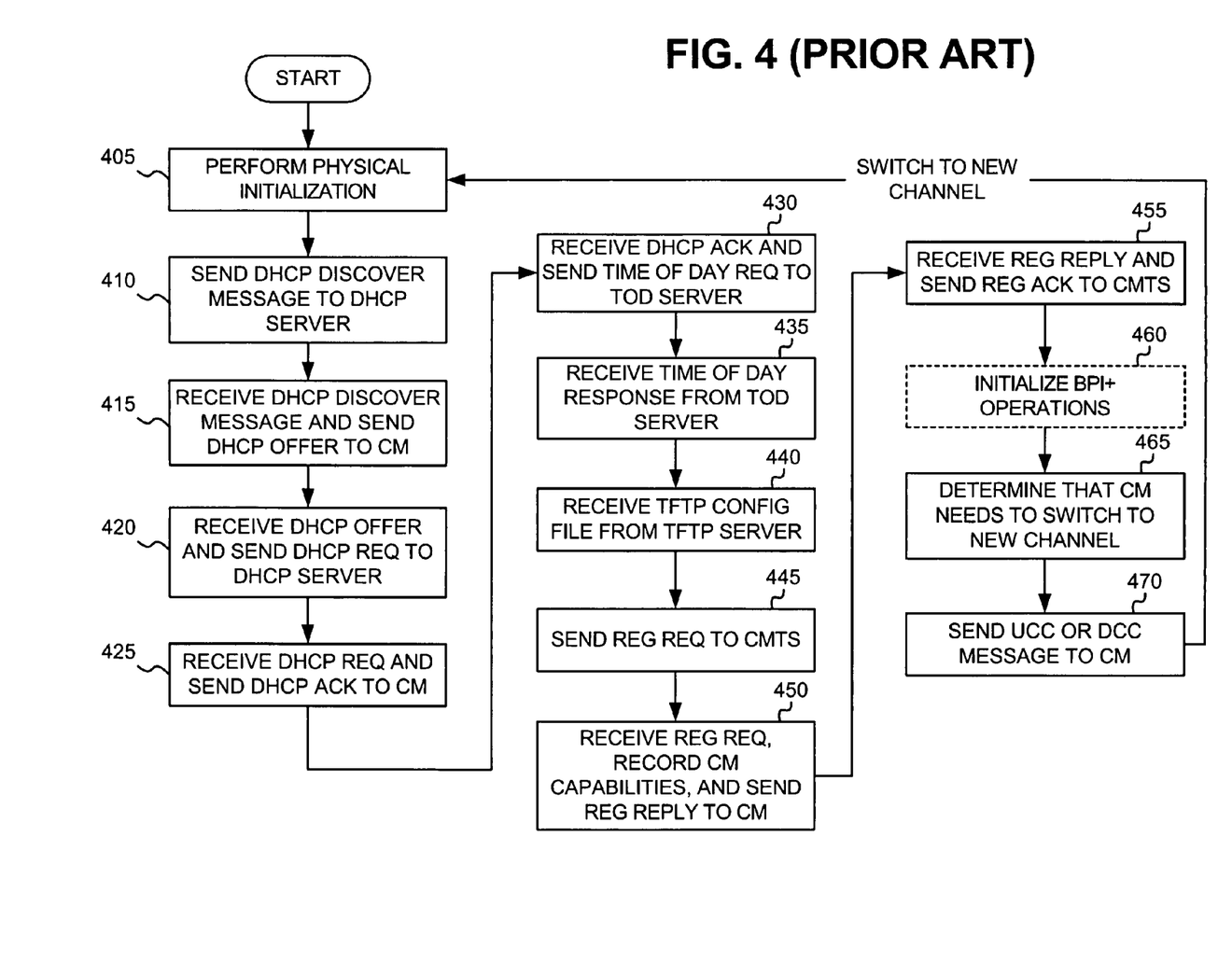
FIG. 4 illustrates a conventional CM initialization process.

Processing begins with a CM performing a physical initialization operation (act 405). The physical initialization operation may include, for example, scanning and synchronizing to a downstream channel, obtaining a set of transmission parameters for a possible upstream channel, and performing a ranging and ranging parameter adjustment process. The physical initialization process may also include a device class identification operation in which the CM identifies itself to the CMTS for use in provisioning.

Following the physical initialization operation, the CM establishes IP connectivity. To do so, the CM transmits a DHCP discover message to a DHCP server through the CMTS to obtain a network address and any other parameters needed to establish IP connectivity (act 410). The discover message requests that the DHCP server assign a network address to the CM. In some instances, the discover message may suggest values for the network address and a network address lease duration.

The DHCP server responds to the DHCP discover message by sending a DHCP offer message to the CM (act 415). The DHCP offer message may include an available network address. Upon receiving the DHCP offer message, the CM transmits a DHCP request (REQ) message to the DHCP server (act 420). The DHCP request message may request that the DHCP server allocate the offered network address to the CM. The DHCP server acknowledges the assignment of the particular network address by transmitting a DHCP acknowledgment (ACK) message to the CM (act 425). The DHCP acknowledgment message may also include an address of the server (e.g., a TFTP server) to be accessed for retrieving operational configuration parameters and the name of the configuration file to be read from the server.

The CM sends a time of day (TOD) request to a time of day server to obtain the current date and time (act 430). In response to receiving the TOD request, the time of day server transmits a time of day response to the CM that includes the current date and time (act 435). The CM downloads operational parameters from the TFTP server using the address and file name specified in the DHCP acknowledgment message (act 440).

To begin transmitting data to the network, the CM performs a registration operation. The CM sends a registration (REG) request to the CMTS (act 445). The registration request may include the CM's capabilities, such as its configured class of service and other operational parameters from the CM's configuration file. In response to the registration request, the CMTS records the CM capabilities transmitted in the registration request and transmits a registration reply that indicates that the CM may begin forwarding traffic to the network (act 450).

To verify receipt of the registration reply, the CM sends a registration acknowledgment message to the CMTS (act 455). The CM may then optionally initialize Baseline Privacy (BP) or Baseline Privacy Plus (BP+) operations, in a well-known manner, in those instances when the CM is provisioned to run Baseline Privacy (act 460).

In some instances, the CMTS may determine, based on the CM's capabilities information in the registration request, that the CM should switch to another upstream channel (e.g., one that is better suited to handle the type of traffic coming from this CM). Assume that the CMTS determines, based on the configuration information provided in the registration request, that the CM needs to be switched to a specific upstream channel (act 465). For example, the configuration information may indicate that the CM handles VoIP traffic. If the upstream channel to which the CM is assigned cannot handle VoIP traffic, the CMTS may send the CM an Upstream Channel Change (UCC) message or a Dynamic Channel Change (DCC) message to notify the CM that it is to switch to a new upstream channel (e.g., one that is better suited for handling VoIP traffic) (act 470).

In response to the UCC or DCC message, CM may have to reboot (since it has already registered with the CMTS) and processing returns to act 405 where the CM goes through the entire initialization process again on the new upstream channel. Having to reboot and go through the entire initialization process again can cause a large delay in getting the CM initialized and ready to send traffic to the network. This delay can be, for example, as long as 45 minutes, which is unacceptable to end users.

To significantly reduce this delay consistent with the principles of the invention, the CM may transmit its capabilities in the DHCP discover message. When the CM is to be switched to another channel (like in the example given above), this allows the CMTS to stop the initialization process at an early stage of the process and switch the CM to a new channel. Moreover, the CM can switch to the new channel without having to reboot thereby significantly reducing the delay associated with the conventional technique described above.

Figure 5:
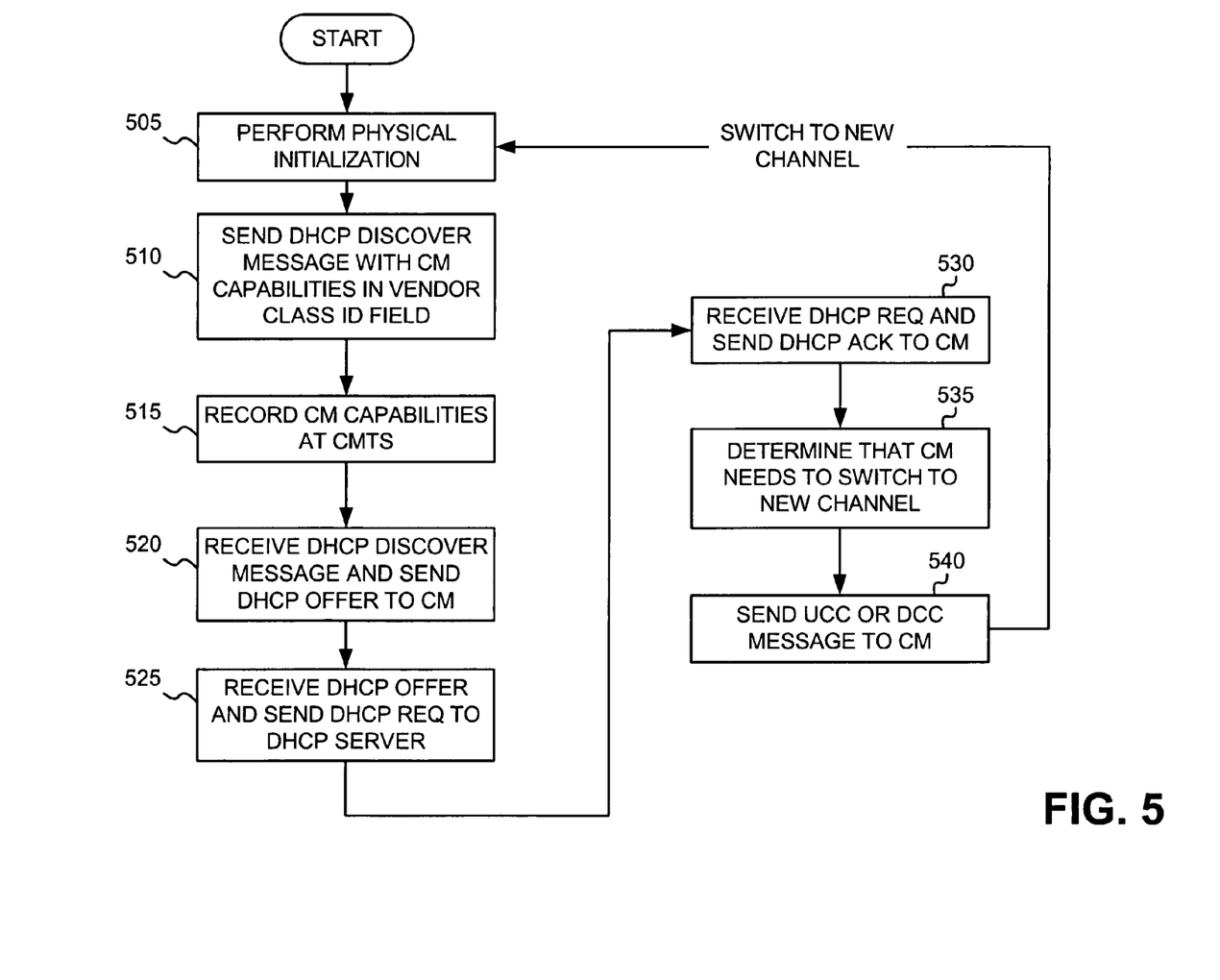
FIG. 5 illustrates an exemplary process for performing CM initialization according to an implementation consistent with the principles of the invention.

FIG. 5 illustrates an exemplary process for performing CM initialization in an implementation consistent with the principles of the invention. Similar to the conventional technique described with respect to FIG. 4, processing may begin with a CM, such as CM 120, performing a physical initialization operation (act 505). The physical initialization operation may include, for example, scanning and synchronizing to a downstream channel, obtaining a set of transmission parameters for a possible upstream channel, and performing a ranging and ranging parameter adjustment process. The physical initialization process may also include a device class identification operation in which CM 120 identifies itself to a CMTS, such as CMTS 110, for use in provisioning.

Following the physical initialization operation, CM 120 may establish IP connectivity. To do so, CM 120 may generate and transmit a DHCP discover message to a DHCP server, such as DHCP server 140, through CMTS 110 to obtain a network address and any other parameters needed to establish IP connectivity (act 510). The discover message requests that DHCP server 140 assign a network address to CM 120. In some instances, the discover message may include information, such as suggested values for the network address and a network address lease duration. In an implementation consistent with the principles of the invention, CM 120 stores information representing its capabilities in the discover message transmitted to DHCP server 140. In one implementation, the capabilities information is stored in the vendor class identifier field of the DHCP discover message.

Figure 6:
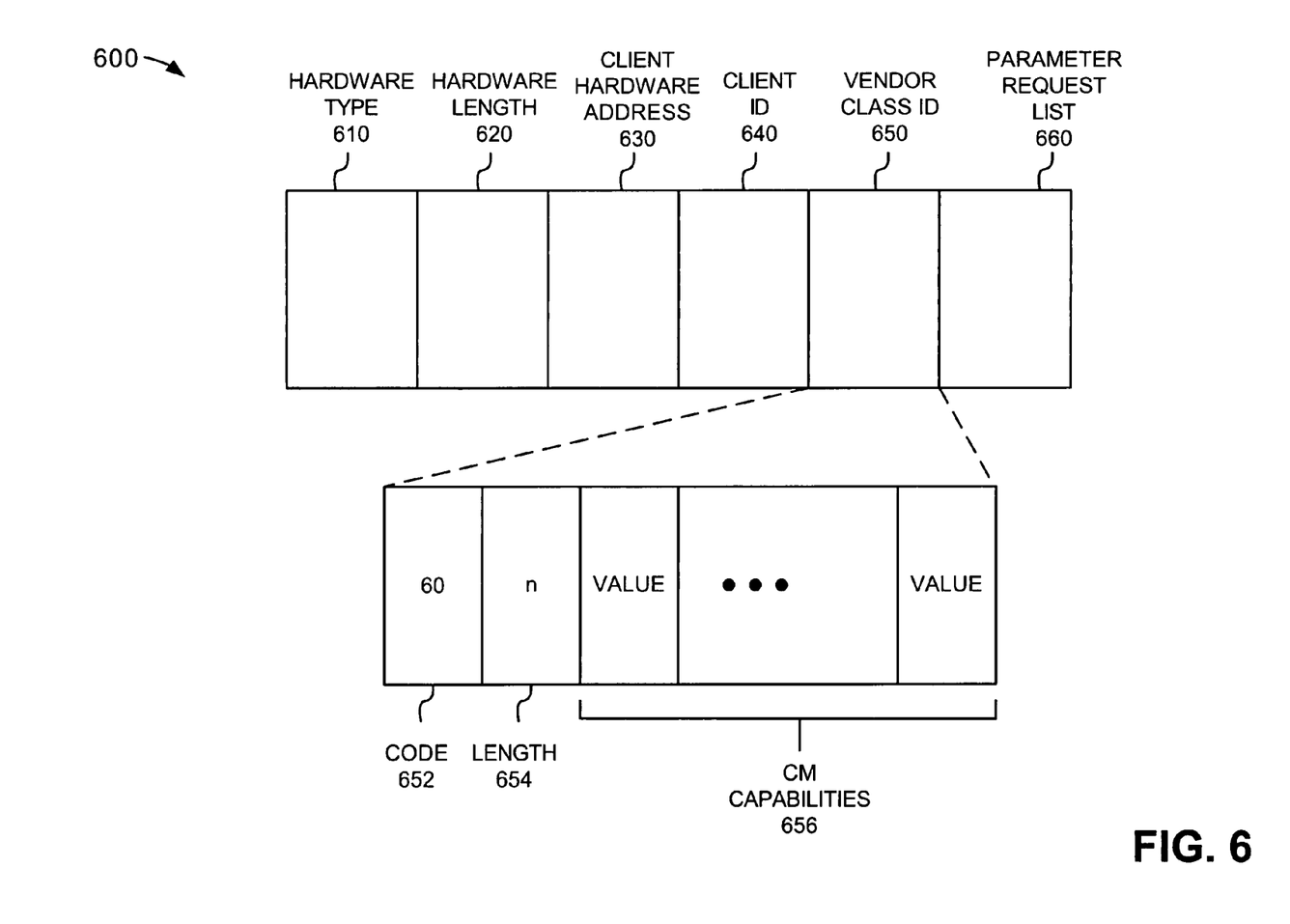
FIG. 6 is a diagram of an exemplary configuration of a discover message that may be transmitted by a CM in an implementation consistent with the principles of the invention.

FIG. 6 is a diagram of an exemplary configuration of a discover message 600 that may be transmitted by CM 120 in an implementation consistent with the principles of the invention. As illustrated, discover message 600 may include a hardware type field 610, a hardware length field 620, a client hardware address field 630, a client identifier (ID) field 640, a vendor class identifier field 650, and a parameter request list 660.

Hardware type field 610 may store information identifying the type of downstream receiver 325 (e.g., Ethernet) associated with CM 120. Hardware length field 620 may store a value representing a length of the address associated with downstream receiver 325 of CM 120. Client hardware address field 630 may store the address (e.g., a 48 bit MAC address) associated with downstream receiver 325 of CM 120. Client identifier field 640 may store, as will be appreciated by one skilled in the art, the address information when CM 120 is in a BOUND, RENEW or REBINDING state and can respond to address resolution protocol (ARP) requests.

Vendor class identifier field 650 may include a code sub-field 652, a length sub-field 654, and several CM capabilities sub-fields 656. Code sub-field 652 is generally set to a value, such as 60. Length sub-field 654 stores information identifying the length (n) of vendor class identifier field 650. CM capabilities sub-field 656 may store values that represent CM 120's capabilities. These capabilities can include, for example, whether CM 120 requests concatenation support from CMTS 110, the DOCSIS version of this CM 120, whether CM 120 requests fragmentation support from CMTS 110, whether CM 120 requests payload header suppression support from CMTS 110, whether CM 120 supports DOCSIS 1.1-compliant Internet gateway message protocol (IGMP), whether CM 120 supports BPI or BPI+, the number of downstream security association identifiers (SAIDs) that CM 120 can support, the number of upstream service identifiers (SIDs) that CM 120 can support, the filtering support (e.g., 802.1P filtering or 802.1Q filtering) in CM 120, the maximum number of pre-equalizer taps per modulation interval T supported by CM 120, the number of equalizer taps supported by CM 120, and the dynamic channel change support of CM 120. Other CM capabilities may also be provided. For example, the capabilities may include the CM's configured class of service, such as information indicating that the CM is VoIP-capable, data supporting capable, etc.

CM 120 may use parameter request list field 660 to request specific configuration parameters from DHCP server 140. These configuration parameters may include, for example, a network address or an address lease duration.

Returning to FIG. 5, CMTS 110 may record the CM capabilities from DHCP discover message 600 prior to routing discover message 600 to DHCP server 140 (act 515). DHCP server 140 may receive DHCP discover message 600 and respond by sending a DHCP offer message to CM 120 (act 520). The DHCP offer message may include an available network address. Upon receiving the DHCP offer message, CM 120 may transmit a DHCP request (REQ) message to DHCP server 140 (act 525). The DHCP request message may request that DHCP server 140 allocate the offered network address to CM 120. DHCP server 140 may acknowledge the assignment of the particular network address by transmitting a DHCP acknowledgment (ACK) message to CM 120 (act 530). The DHCP acknowledgment message may also include an address of the server (e.g., a TFTP server 160) to be accessed for retrieving operational configuration parameters and the name of the configuration file to be read from server 160.

In an implementation consistent with the principles of the invention, CMTS 110 may determine, based on the CM's capabilities information in DHCP discover message 600, the CM's configured class of service (e.g., that CM 120 is VoIP-capable) and whether this CM 120 should switch to another upstream channel (e.g., one that is better suited to handle the type of traffic coming from this type of CM). Similar to the exemplary situation described above with respect to FIG. 4, assume that CMTS 110 determines, based on the CM capabilities information provided in DHCP discover message 600, that CM 120 should switch to a specific upstream channel (act 535). For example, the capabilities information may indicate that CM 120 handles VoIP traffic. If CMTS 110 determines that the upstream channel to which CM 120 is assigned cannot handle VoIP traffic, CMTS 110 may send CM 120 a UCC message or a DCC message to notify CM 120 that it is to switch to a new upstream channel (e.g., one that is better suited for handling VoIP traffic) (act 540).

In response to the UCC or DCC message, processing may return to act 505 where CM 120 may re-perform the above acts on the new upstream channel. By redirecting CM 120 to a new channel early in the CM initialization process, the large delay associated with the conventional technique described above with respect to FIG. 4 can be considerably reduced. Moreover, CM 120 need not reboot since the CM has not yet registered with CMTS 110. The delay associated with the conventional CM initialization process can thereby be reduced, for example, to a few minutes, which is much more acceptable to end users.

CONCLUSION

Systems and methods consistent with the principles of the invention optimize the CM initialization process in situations where the CMTS determines that the initializing CM is to be switched to a different upstream channel. In an exemplary implementation, the CM provides its capabilities in a DHCP discover message, which allows the CMTS to determine the CM's capabilities early in the initialization process.

The foregoing description of exemplary embodiments of the invention provides illustration and description, but is not intended to be exhaustive or to limit the invention to the precise form disclosed. Modifications and variations are possible in light of the above teachings or may be acquired from practice of the invention. For example, while the above description focused on the DOCSIS protocol, it will be appreciated that implementations consistent with the invention may be applicable to other cable network protocols.

While a series of acts has been described with regard to FIG. 5, the order of the acts may be varied in other implementations consistent with the present invention. Moreover, non-dependent acts may be implemented in parallel.

No element, act, or instruction used in the description of the present application should be construed as critical or essential to the invention unless explicitly described as such. Also, as used herein, the article "a" is intended to include one or more items. Where only one item is intended, the term "one" or similar language is used.

The scope of the invention is defined by the claims and their equivalents.

What is claimed is:

1. A method for initializing a device in a cable modem network, the method comprising:

transmitting a dynamic host configuration protocol (DHCP) discover message from the device to a cable modem termination system (CMTS) on a first upstream channel, the DHCP discover message including information representing capabilities of the device;

determining, at the CMTS, whether to switch the device to a second upstream channel based on the capabilities information in the DHCP discover message, the determining occurring before a registration of the device; and transmitting a message to the device instructing the device to switch to the second upstream channel based on the determining.

2. The method of claim 1 where the device is a cable modem.

3. The method of claim 1 further comprising:
assigning a network address to the device; and
transmitting the network address to the device.

4. The method of claim 3 where the transmitting the message to the device occurs after the transmitting the network address.

5. The method of claim 1 where the device and the CMTS communicate using a Data over Cable Service Interface Specification (DOCSIS) protocol.

6. The method of claim 1 where the device stores the capabilities information in a vendor class identifier field of the DHCP discover message.

7. A system comprising:
a first device to:
transmit a dynamic host configuration protocol (DHCP) discover message on a first upstream channel, the DHCP discover message including information representing capabilities of the first device; and
a second device to:
receive the DHCP discover message from the first device,
determine whether to switch the first device to a second upstream channel based on the capabilities information in the DHCP discover message, the determining occurring before a registration of the first device, and
transmit a message to the first device instructing the first device to switch to the second upstream channel based on the determining.

8. The system of claim 7 where the first device is to store the capabilities information in a vendor class identifier field of the DHCP discover message.

9. The system of claim 7 where the capabilities information identifies a configured class of service of the device.

10. The system of claim 7 where the first device is a cable modem and the second device is a cable modem termination system.

11. The system of claim 7 where the first device and the second device communicate using a Data over Cable Service Interface Specification (DOCSIS) protocol.

12. A method for initializing a device in a cable modem network, the method comprising:

receiving, via an upstream communication interface, a dynamic host configuration protocol (DHCP) discover message from the device via a first upstream channel, the DHCP discover message including information representing one or more capabilities of the device;

determining, via a processing device, whether to switch the device to a new upstream channel based on the one or more capabilities in the DHCP discover message; and transmitting, via a downstream communication interface, a message to the device instructing the device to switch to the new upstream channel based on the determining, the transmitting a message occurring prior to a registration of the device.

13. The method of claim 12 where the device is a cable modem.

14. The method of claim 12 where the message includes one of a Dynamic Channel Change (DCC) message or an Upstream Channel Change (UCC) message.

15. The method of claim 12 where the information representing one or more capabilities of the device is stored in a vendor class identifier field of the DHCP discover message.

16. A network device in a cable network, the network device comprising:
an upstream communication interface to receive a dynamic host configuration protocol (DHCP) discover message from a remote device via a first upstream channel, the DHCP discover message including information representing one or more capabilities of the remote device;
a processing device to determine whether to switch the remote device to a new upstream channel based on the one or more capabilities in the received DHCP discover message; and
a downstream communication interface to transmit a control message to the remote device instructing the remote device to switch to the new upstream channel based on the determining, where the downstream communication interface transmits the control message prior to a registration of the remote device.

17. The network device of claim 16 where the remote device includes a cable modem.

18. The network device of claim 16 where
the information representing one or more capabilities of the remote device is stored in a vendor class identifier field of the DHCP discover message.

19. The network device of claim 16 where the control message includes one of a Dynamic Channel Change (DCC) message or an Upstream Channel Change (UCC) message.

20. The network device of claim 16 where the network device and remote device communicate using a Data over Cable Service Interface Specification (DOCSIS) protocol.

21. A method for initializing a device in a cable network, the method comprising:
generating, via a processing unit, a dynamic host configuration protocol (DHCP) discover message that includes one or more capabilities of the device;
transmitting, via an upstream transmitter, the first DHCP discover message to a remote device via a upstream channel; and
receiving, via a downstream receiver and in response to the transmitting, a second message from the remote device, the second message instructing the device to switch to a second upstream channel, the second message being received prior to a registration of the device.

22. The method of claim 21 where
the one or more capabilities of the device are stored in a vendor class identifier field of the DHCP discover message.

23. The method of claim 21 where the one or more capabilities include information representing a configured class of service of the device.

24. The method of claim 21 further comprising:
switching to the second upstream channel without rebooting the device.

25. A method for initializing a device in a cable network, the method comprising:
generating, via a processing unit, a dynamic host configuration protocol (DHCP) discover message that includes one or more capabilities of the device;
transmitting, via an upstream transmitter, the DHCP discover message to a remote device via a first upstream channel;
receiving, via a downstream receiver and in response to the transmitting, a second message from the remote device, the second message instructing the device to switch to a second upstream channel; and
switching, via the processing unit, the device to the second upstream channel without rebooting the device and prior to a registration of the device.

26. A network device comprising:
means for generating a dynamic host configuration protocol (DHCP) discover message that includes one or more capabilities of the device;
means for transferring the DHCP discover message to a remote device via a first upstream channel in a cable network; and
means for receiving, in response to transferring the DHCP discover message, a second message from the remote device, the second message instructing the device to switch to a second upstream channel and being received prior to a registration of the device.

27. The network device of claim 26 where the device includes a cable modem and the remote device includes a cable modem terminating system (CMTS).

28. The network device of claim 26 where
the one or more capabilities of the device are stored in a vendor class identifier field of the DHCP discover message.

* * * * *